(12) United States Patent
Kadav et al.

(10) Patent No.: US 10,402,234 B2
(45) Date of Patent: *Sep. 3, 2019

(54) FINE-GRAIN SYNCHRONIZATION IN DATA-PARALLEL JOBS

(71) Applicant: NEC Laboratories America, Inc., Princeton, NJ (US)

(72) Inventors: Asim Kadav, Plainsboro, NJ (US); Erik Kruus, Hillsborough, NJ (US)

(73) Assignee: NEC CORPORATION (JP)

( * ) Notice: Subject to any disclaimer, the term of this patent is extended or adjusted under 35 U.S.C. 154(b) by 168 days.

This patent is subject to a terminal disclaimer.

(21) Appl. No.: 15/480,874

(22) Filed: Apr. 6, 2017

(65) Prior Publication Data

US 2017/0300356 A1  Oct. 19, 2017

Related U.S. Application Data

(60) Provisional application No. 62/322,849, filed on Apr. 15, 2016.

(51) Int. Cl.
*G06F 9/46* (2006.01)
*G06F 9/52* (2006.01)
*H04L 29/08* (2006.01)

(52) U.S. Cl.
CPC .......... *G06F 9/52* (2013.01); *H04L 67/1095* (2013.01)

(58) Field of Classification Search
CPC .................................. G06F 9/52; G06F 9/522
USPC ......................................................... 717/149
See application file for complete search history.

(56) References Cited

U.S. PATENT DOCUMENTS 7,512,950 B1 * 3/2009 Marejka .................... G06F 9/52
 718/102
8,250,133 B2 * 8/2012 Blumrich .................. G06F 9/52
 709/201

(Continued)

OTHER PUBLICATIONS

"Unsynchronized Techniques for Approximate Parallel Computing"; Martin C. Rinard—MIT EECS and CSAIL; RACES Workshop, 2012.*

(Continued)

*Primary Examiner* — Francisco J Aponte
(74) *Attorney, Agent, or Firm* — Joseph Kolodka

(57) ABSTRACT

A computer-implemented method and computer processing system are provided. The method includes synchronizing, by a processor, respective ones of a plurality of data parallel workers with respect to an iterative process. The synchronizing step includes individually continuing, by the respective ones of the plurality of data parallel workers, from a current iteration to a subsequent iteration of the iterative process, responsive to a satisfaction of a predetermined condition thereby. The predetermined condition includes individually sending a per-receiver notification from each sending one of the plurality of data parallel workers to each receiving one of the plurality of data parallel workers, responsive to a sending of data there between. The predetermined condition further includes individually sending a per-receiver acknowledgement from the receiving one to the sending one, responsive to a consumption of the data thereby.

2 Claims, 6 Drawing Sheets

(56) References Cited

U.S. PATENT DOCUMENTS

| | | | | |
|---|---|---|---|---|
| 8,656,400 | B2* | 2/2014 | Foo | G06F 9/3851 |
| | | | | 718/102 |
| 8,832,712 | B2* | 9/2014 | Houston | G06F 9/522 |
| | | | | 714/39 |
| 8,839,216 | B2* | 9/2014 | Liu | G06F 8/4441 |
| | | | | 717/151 |
| 8,875,146 | B2* | 10/2014 | McCready | G06F 9/4881 |
| | | | | 718/103 |
| 9,207,977 | B2* | 12/2015 | Easwaran | G06F 9/4887 |
| 9,235,769 | B2* | 1/2016 | Oro Garcia | G06K 9/00973 |
| 9,612,868 | B2* | 4/2017 | Easwaran | G06F 9/4881 |
| 9,984,337 | B2* | 5/2018 | Kadav | G06F 17/30174 |
| 2004/0263519 | A1* | 12/2004 | Andrews | G06F 15/7846 |
| | | | | 345/502 |
| 2006/0212868 | A1* | 9/2006 | Takayama | G06F 9/52 |
| | | | | 718/100 |
| 2008/0104367 | A1* | 5/2008 | Blumrich | G06F 15/17381 |
| | | | | 712/11 |
| 2009/0006808 | A1* | 1/2009 | Blumrich | G06F 15/17337 |
| | | | | 712/12 |
| 2011/0219280 | A1* | 9/2011 | Blumrich | H03M 13/09 |
| | | | | 714/748 |
| 2013/0024662 | A1* | 1/2013 | Renganarayana | G06F 9/3004 |
| | | | | 712/208 |
| 2013/0145379 | A1* | 6/2013 | Faraj | G06F 9/522 |
| | | | | 718/106 |
| 2015/0033000 | A1* | 1/2015 | Vorbach | G06F 12/1433 |
| | | | | 712/221 |
| 2016/0011996 | A1* | 1/2016 | Asaad | G06F 15/76 |
| | | | | 710/308 |

OTHER PUBLICATIONS

"Synchronization Trade-offs in GPU implementations of Graph Algorithms"; Rashid Kaleem, Anand Venkat, Sreepathi Pai, Mary Hall, Keshav Pingali. 2016 IEEE International Parallel and Distributed Processing Symposium.*

"Exploiting Fine-Grained Data Parallelism with Chip Multiprocessors and Fast Barriers"; Jack Sampson, Rubén González, Jean-Francois Collard, Norman P. Jouppi, Mike Schlansker, Brad Calder. The 39th Annual IEEE/ACM International Symposium on Microarchitecture (MICRO'06).*

"Fine-grain Parallelism with Minimal Hardware Support: A Compiler-Controlled Threaded Abstract Machine"; David E. Culler Anurag Sah, Klaus Erik Schauser, Thorsten von Eicken John Wawrzynek. Computer Science Division, EECS Department University of California, Berkeley. 1991 ACM.*

Dean et al., "MapReduce: Simplied Data Processing on Large Clusters", OSDI 2004, Mar. 2004, pp. 1-13.

Dean et al., "Large Scale Distributed Deep Networks", NIPS 2012: Neural Information Processing Systems, Dec. 2012, pp. 1-9.

Li et al., "Scaling Distributed Machine Learning with the Parameter Server", Proceedings of the 11th USENIX Symposium on Operating Systems Design and Implementation, Oct. 2014, pp. 583-598.

Malewicz, et al., "Pregel: A System for Large-Scale Graph Processing", SIGMOD'10, Jun. 2010, pp. 135-145.

Valiant, et al., "A Bridging Model for Parallel Computation", Communications of the ACM, Aug. 1990, pp. 103-111, vol. 33, No. 8.

Zaharia,, et al., "Resilient Distributed Datasets: A Fault-Tolerant Abstraction for In-Memory Cluster", Jul. 2011, 14, pages.

* cited by examiner

FINE-GRAIN SYNCHRONIZATION IN DATA-PARALLEL JOBS

RELATED APPLICATION INFORMATION

This application claims priority to provisional application Ser. No. 62/322,849 filed on Apr. 15, 2016, incorporated herein by reference.

BACKGROUND

Technical Field

The present invention relates to information processing, and more particularly to fine-grain synchronization in data-parallel jobs.

Description of the Related Art

Big-data processing involves multiple parallel Workers, or multiple workers and a single master. Existing worker synchronization is typically performed using a barrier primitive or via a file-system (using stage-wise synchronization).

Barrier synchronization is an important and widely used operation for synchronizing parallel systems. Upon encountering a barrier operation, a process waits until all processes in the system have reached a barrier. The barrier operation is the most commonly cased synchronization primitive in data-parallel primitive.

However, this style of synchronization suffers from several problems. First, barrier primitives are slow and removing such a primitive (asynchronous) breaks down correctness semantics. Second, most barrier implementations synchronize with all processes and may be slow to synchronize a subset of workers. Third, using a barrier with a bulk-synchronous processing paradigm suffers from mixed-version issues. For example, in the absence of receiver side synchronization, there may be torn-reads and over-writes. This is because a barrier gives no information if the recipient has seen or processed the gradient and additional expensive synchronization may be required. Finally, using a barrier also causes network resource spikes since all workers will send intermediate values at the same time. Thus, there is a need for improved synchronization in data parallel jobs.

SUMMARY

These and other drawbacks and disadvantages of the prior art are addressed by the present principles, which are directed to fine-grain synchronization in data-parallel jobs.

According to an aspect of the present invention, a computer-implemented method is provided. The method includes synchronizing, by a processor, respective ones of a plurality of data parallel workers with respect to an iterative process. The synchronizing step includes individually continuing, by the respective ones of the plurality of data parallel workers, from a current iteration to a subsequent iteration of the iterative process, responsive to a satisfaction of a predetermined condition thereby. The predetermined condition includes individually sending a per-receiver notification from each sending one of the plurality of data parallel workers to each receiving one of the plurality of data parallel workers, responsive to a sending of data there between. The predetermined condition further includes individually sending a per-receiver acknowledgement from the receiving one to the sending one, responsive to a consumption of the data thereby.

According to another aspect of the present invention, a computer program product is provided for data synchronization. The computer program product includes a non-transitory computer readable storage medium having program instructions embodied therewith. The program instructions are executable by a computer to cause the computer to perform a method. The method includes synchronizing, by a processor, respective, ones of a plurality of data parallel workers with respect to an iterative process. The synchronizing step includes individually continuing, by the respective ones of the plurality of data parallel workers, from a current iteration to a subsequent iteration of the iterative process, responsive to a satisfaction of a predetermined condition thereby. The predetermined condition includes individually sending a per-receiver notification from each sending one of the plurality of data parallel workers to each receiving one of the plurality of data parallel workers, responsive to a sending of data there between. The predetermined condition further includes individually sending a per-receiver acknowledgement from the receiving one to the sending one, responsive to a consumption of the data thereby.

According to yet another aspect of the present invention, a computer processing system is provided. The computer processing system includes a processor. The processor is configured to synchronize respective ones of a plurality of data parallel workers with respect to an iterative process. The processor permits the respective ones of the plurality of data parallel workers to individually continue from a current iteration to a subsequent iteration of the iterative process, responsive to a satisfaction of the predetermined condition thereby. The predetermined condition includes (i) individually sending a per-receiver notification from each sending one of the plurality of data parallel workers to each receiving one of the plurality of data parallel workers, responsive to a sending of data there between, and (ii) individually sending a per-receiver acknowledgement from the receiving one to the sending one, responsive to a consumption of the data thereby.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of;preferred embodiments with reference to the following figures wherein.

DETAILED DESCRIPTION OF PREFERRED EMBODIMENTS

The present invention relates to fine-grain synchronization M data-parallel jobs.

The invention provides fine-grained synchronization for data-parallel tasks in a big data processing environment.

In an embodiment, in order to provide an efficient wait mechanism for partial reduce operations, the present invention uses a notify mechanism with respect to the sender when sending updated output values to the sender. With parallel threads over a shared memory or Remote Direct Memory Access (RDMA), a send operation may not notify the receiver about the incoming, parameters. In an embodiment of the present invention, a per-receiver notification allows for fine-grained synchronization and removes the inefficiency that is introduced by a global barrier.

To reduce the barrier overhead for partial-reduce operations and for strong consistency, the present invention provides a notify-ack (notify-acknowledgement) based mechanism that gives stricter guarantees than a single barrier and can improve performance in some cases. All processes compute and send their model parameters and send notifications to the receivers. The receiver consumes the model parameters and performs a reduce operation and sends an acknowledgment to all its senders indicating that it has consumed its gradient. Hence, when using a notify-ack based service, each receiver acknowledges processing of incoming model parameters to the receivers. This removes the problem of mixed-version Vectors. Furthermore, this fine-grained synchronization allows efficient implementation of partial reduce operations since each sender is only blocked on its incoming receivers.

Fine-grained synchronization in accordance with the present invention achieves correctness and performance improvements over many big data, data parallel jobs. Such big data, data parallel jobs include, but are not limited to, machine learning, graph processing, log processing, and so forth. Essentially, the present invention can be applied, to any parallel computing environment, as readily appreciated by one of ordinary skill in the art, given the teachings of the present invention provided herein. To the preceding and other applications, the present invention provides: (i) faster processing; (ii) correct execution and synchronization semantics as compared to a barrier; and (iii) load balanced network sharing.

Figure 1:
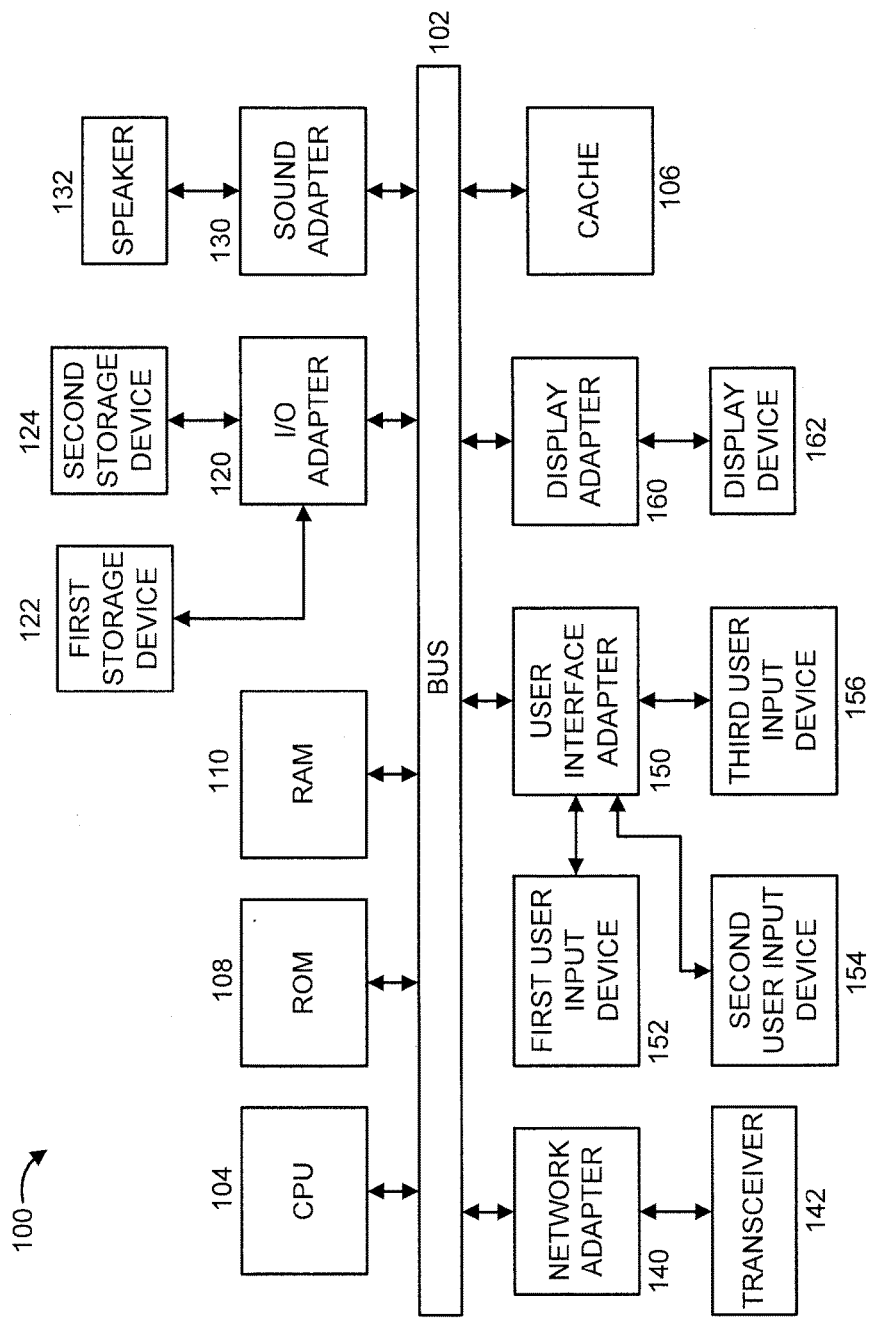
FIG. 1 is a block diagram illustrating an exemplary processing system to which the present principles may be applied, according to an embodiment of the present principles.

Referring now in detail to the figures in which like numerals represent the same or similar elements and initially to FIG. 1, a block diagram illustrating an exemplary processing system 100 to which the present principles may be applied, according to an embodiment of the present principles, is shown. The processing system 100 includes at least one processor (CPU) 104 operatively coupled to other components via a system bus 102. A cache 106, a Read Only Memory (ROM) 108, a Random. Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input, device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100 depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
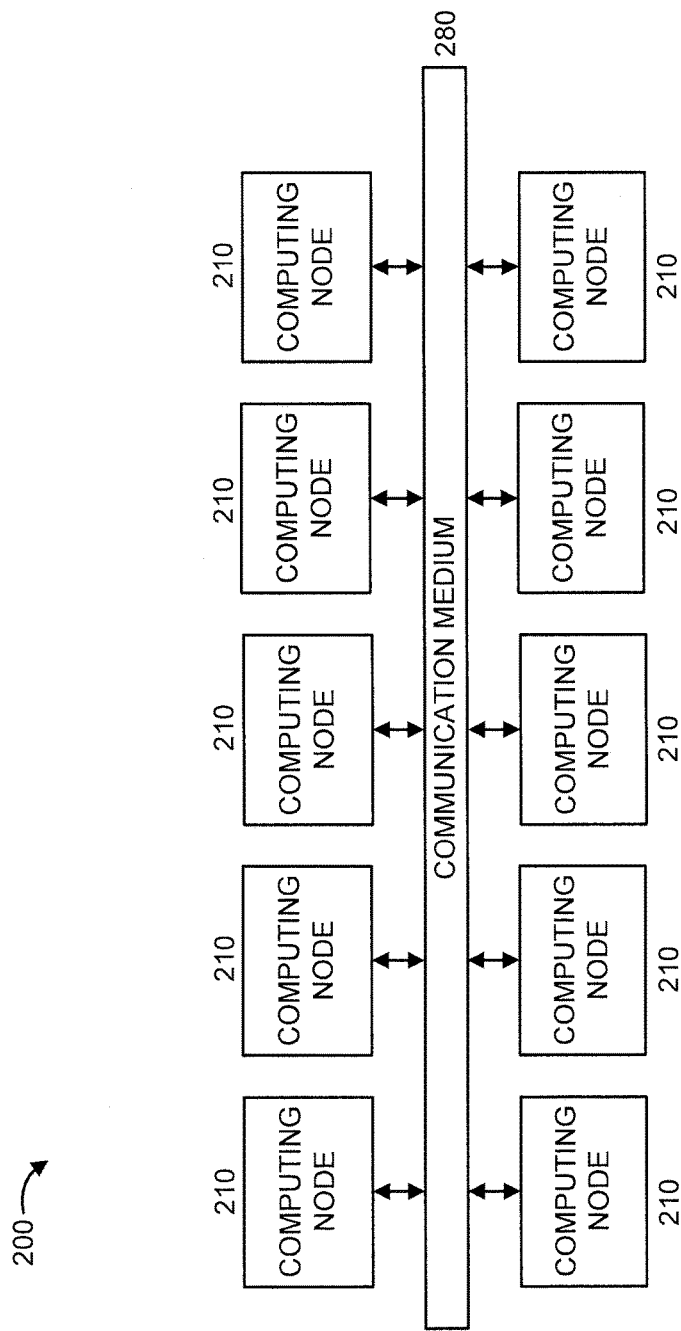
FIG. 2 shows an exemplary environment to which the present invention can be applied, in accordance with an embodiment of the present principles.

Moreover, it is to be appreciated that environment 200 described below with respect to FIG. 2 is an environment for implementing respective embodiments of the present principles. Part or all of processing system 100 may be implemented in one or more of the elements of environment 200.

Figure 5:
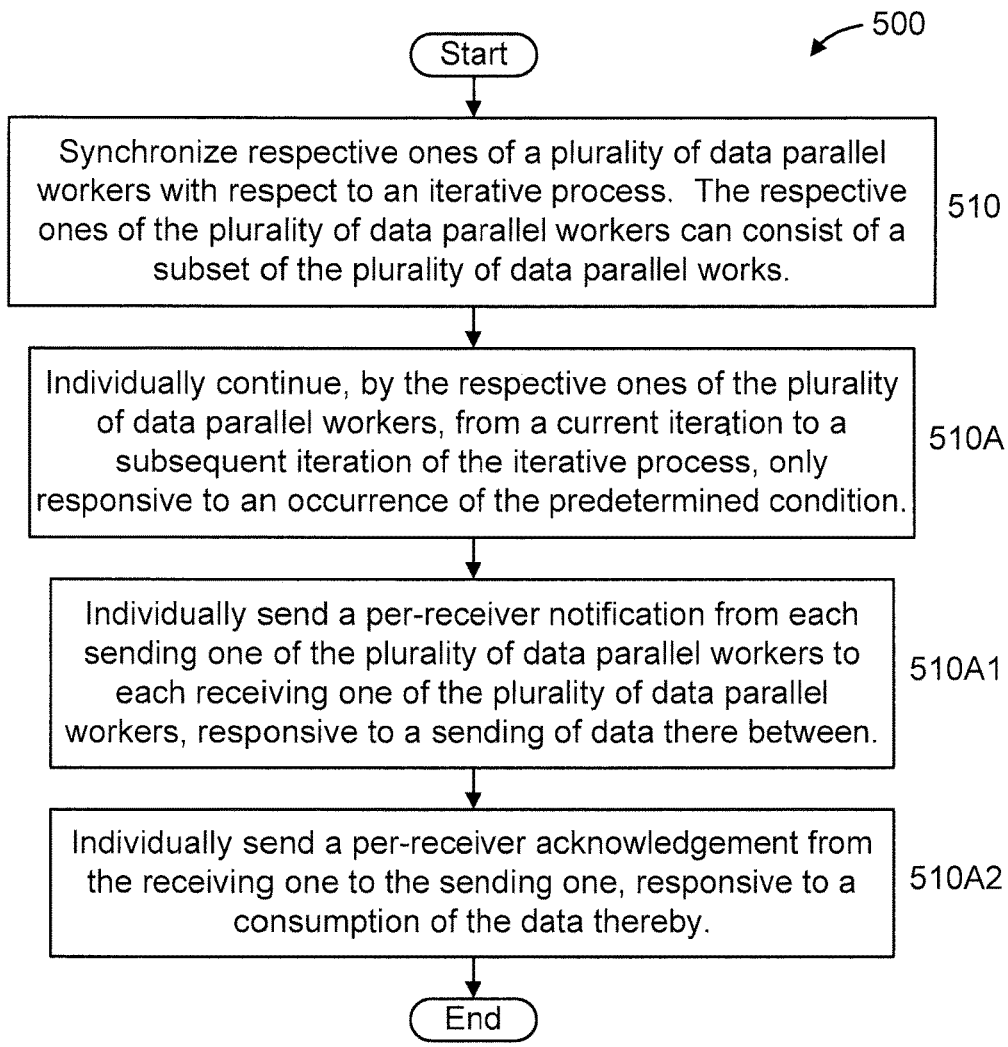
FIG. 5 shows an exemplary method for fine-grain synchronization of data parallel jobs, in accordance with an embodiment of the present principles.
Figure 6:
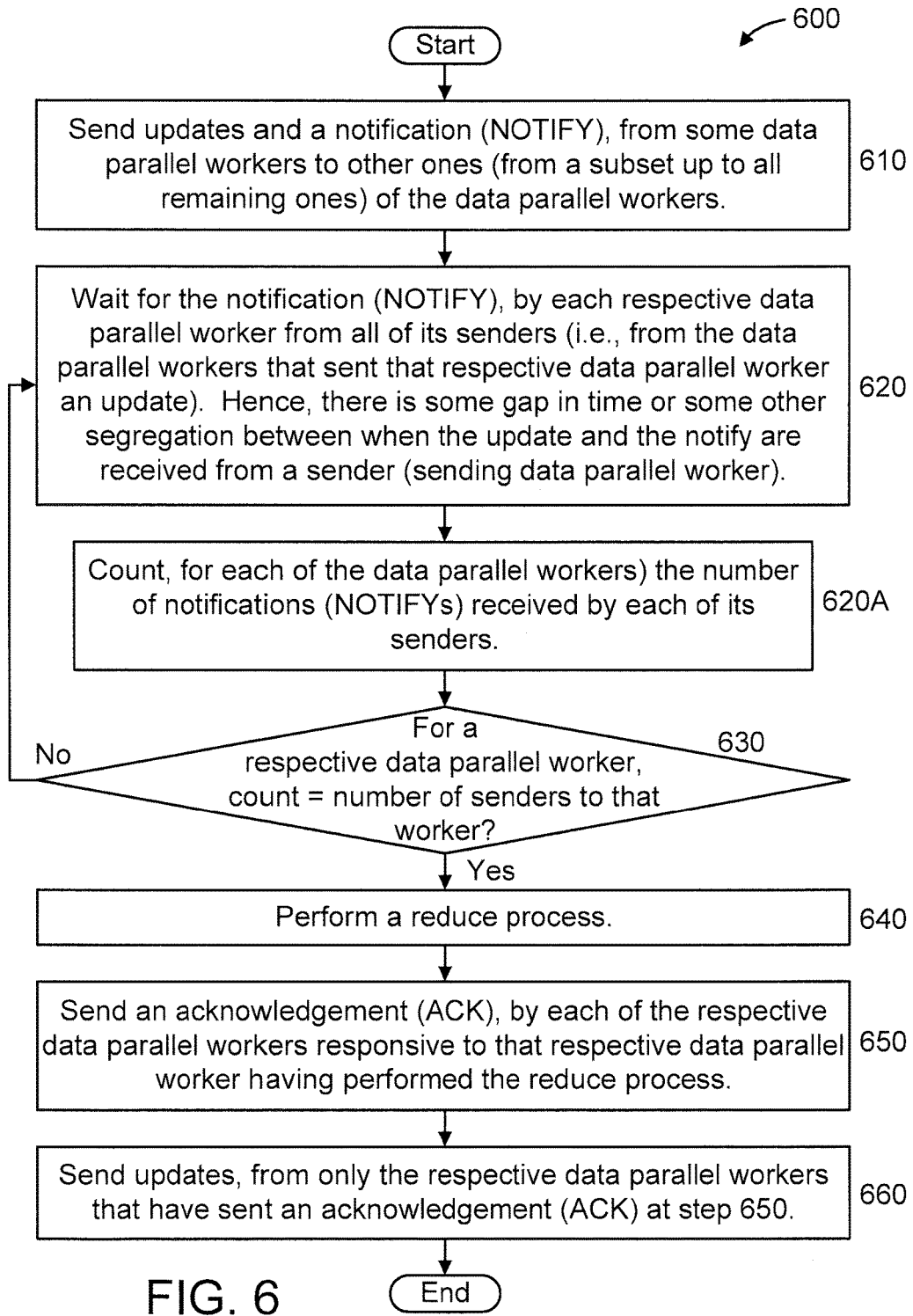
FIG. 6 shows another exemplary method for fine-grain synchronization of data. parallel jobs, in accordance with an embodiment of the present principles.

Further, it is to be appreciated that processing system 100 may perform at least part of the method described herein including, for example, at least part of method 500 of FIG. 5 and/or at least part of method 600 of FIG. 6. Similarly, part or all of environment 200 may be used to perform at least part of method 500 of FIG. 5 and/or at least part of method 600 of FIG. 6.

FIG. 2 shows an exemplary environment 200 to which the present invention can be applied, in accordance with an embodiment of the present principles.

The environment 200 includes a set of computing nodes (collectively and individually denoted by the figure reference numeral 210). Each of the computing nodes in the set 210 is configured to perform data parallel jobs and to perform fine-grained synchronization for the data parallel jobs.

In an embodiment, each of the computing nodes 210 is a parallel worker. In an embodiment, none of the computing nodes 210 is a master node. In another embodiment, one of the computing nodes 210 is a master node.

The set of computing nodes 210 can be configured t implement MapReduce operations, a Message Passing Interface (MPI), and so forth.

The set of computing nodes 210 can be implemented by, for example, separate computing devices or different items (threads, processes, etc.) in a single computing device. Of course, other implementations can also be employed, while maintaining the spirit of the present invention.

The set of computing nodes 210 are interconnected by a communication medium 280. The communication medium 280 can involve any type of communication medium, depending upon the implementation. For example, a bus, a network, a Message Passing Interface (MPI), and so forth can be used, while maintaining the spirit of the present invention.

Figure 3:
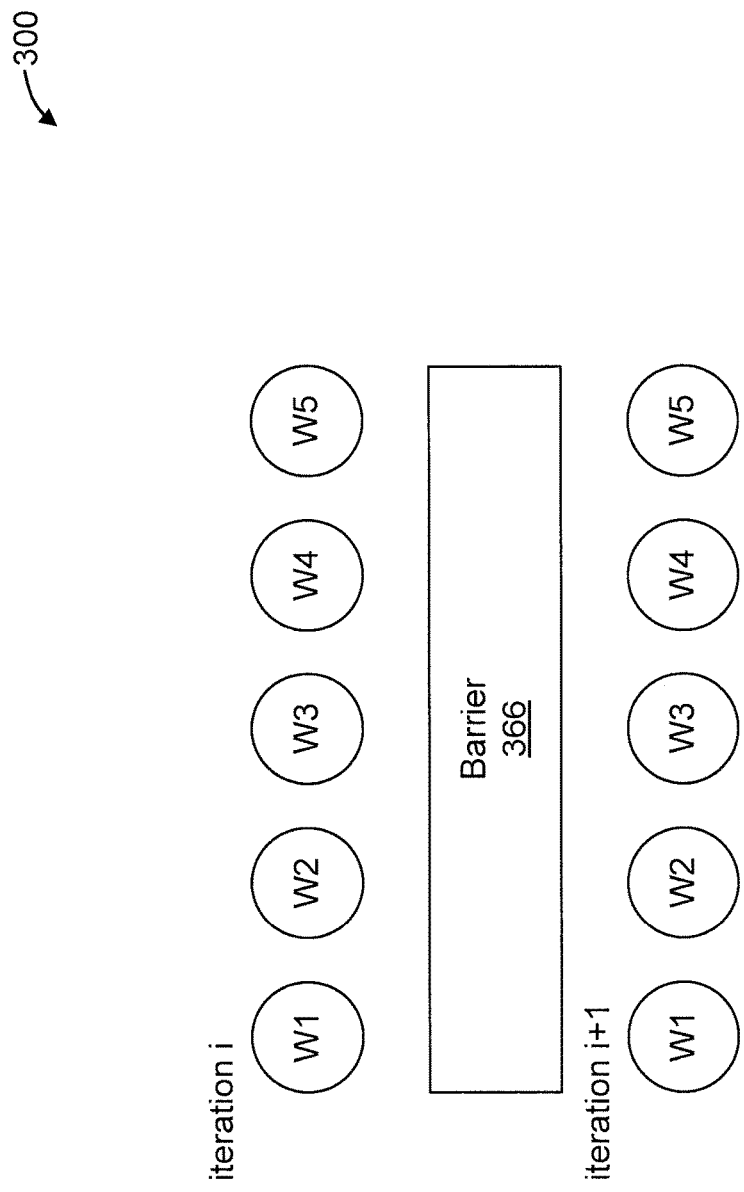
FIG. 3 shows an exemplary synchronization condition to which the present invention can be applied, in accordance with an embodiment of the present principles.

FIG. 3 shows an exemplary synchronization condition 300 to which the present invention can be applied, in accordance with an embodiment of the present principles. The synchronization condition 300 involves workers W1-W5. The following synchronization semantics apply: (i) workers W1, W2 and W3 synchronize with one another; workers W3, W4 and W5 synchronize with one another. The synchronization condition 300 uses a barrier condition 366.

With the current synchronization methods in Hadoop®, Spark and other machine learning and graph learning frameworks, all workers wait for everyone at the barrier and then proceed to the next iteration.

Figure 4:
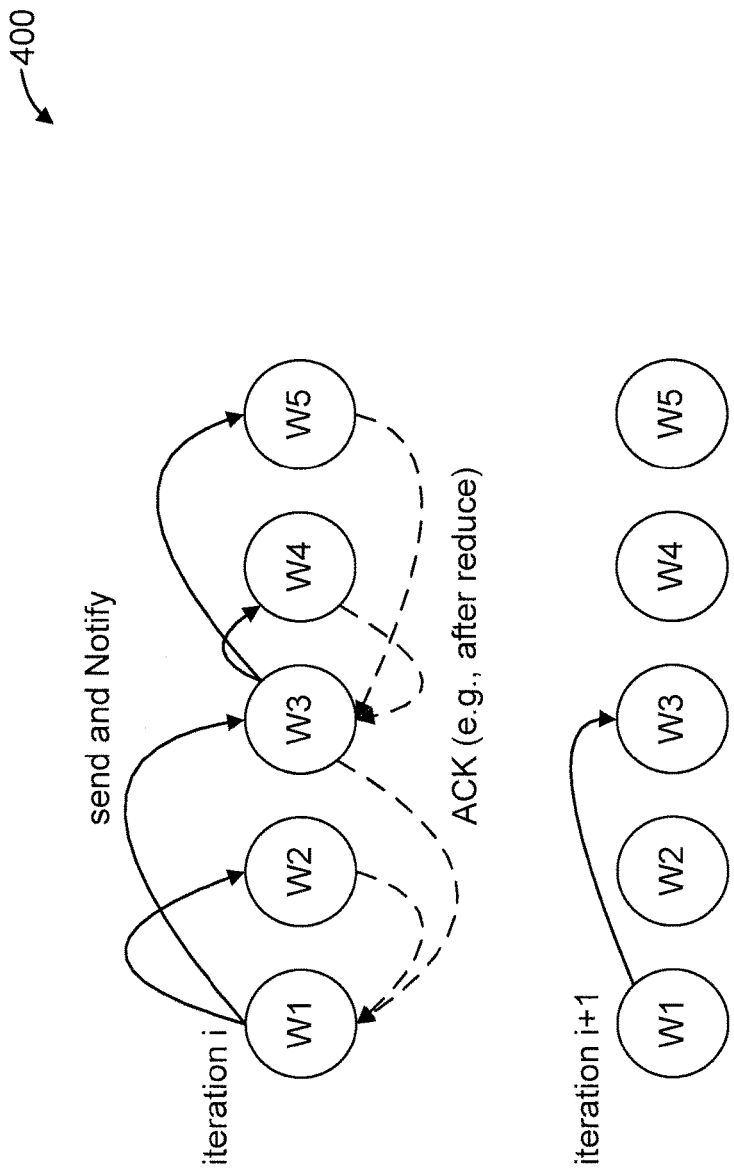
FIG. 4 shows an exemplary synchronization condition, in accordance with an embodiment of the present principles.

FIG. 4 shows an exemplary synchronization condition 400, in accordance with an embodiment of the present principles.

The synchronization condition 400 involves the same workers and synchronization semantics as shown in FIG. 3, with the exception that no barrier condition is used. That is, the synchronization condition 300 does not use a barrier condition.

The solid lines represent a SEND (updates, e.g., but not limited to, model parameters) and a NOTIFY (notification) and the dotted lines represent a corresponding ACK (acknowledgement). The corresponding ACK can be sent by respective ones of the workers, for example, after the respective ones of the workers perform a reduce process. Workers only wait for their dependencies and continue with the next iteration as soon as they receive the NOTIFY from all incoming nodes.

FIG. 5 shows an exemplary method 500 for fine-grain synchronization of data parallel jobs, in accordance with an embodiment of the present principles.

At step 510, synchronize respective ones of a plurality of data parallel workers with respect to an iterative process. In an embodiment, the respective ones of the plurality of data parallel workers can consist of a subset of the plurality of data parallel works.

In an embodiment, step 510 includes step 510A.

At step 510A, individually continue, by the respective ones of the plurality of data parallel workers, from a current iteration to a subsequent iteration of the iterative process, responsive to a satisfaction of the predetermined condition thereby.

In an embodiment, the predetermined condition of step 510A includes steps 510A1 and 510A2.

At step 510A1, individually send a per-receiver notification from each sending one of the plurality of data parallel workers to each receiving one of the plurality of data parallel workers, responsive to a sending of data there between.

At step 510A2, individually send a per-receiver acknowledgement from the receiving one to the sending one, responsive to a consumption of the data thereby.

The method 600 specifically relates to an example where the involved parallel workers performing a reduce process. Of course, the present invention can be applied to other processes that can use and benefit from fine-grain synchronization in accordance with the present invention. In general, workers only wait for intermediate outputs from dependent workers to perform the reduce process. After the reduce process, the workers push more data out when the workers receive an ACK from receivers signaling that the sent parameter update has been consumed.

At step 610, send updates (e.g., model parameters) and a notification (NOTIFY), from some data parallel workers to other ones (from a subset up to all remaining ones) of the data parallel workers.

At step 620, wait for the notification (NOTIFY), by each respective data parallel worker from all of its senders (i.e., from the data parallel workers that sent that respective data parallel worker an update). Hence, there is some gap in time or some other segregation between when the update, and the NOTIFY are received from a sender (sending data parallel worker).

In an embodiment, step 620 includes step 620A.

At step 620A, count, for each of the data parallel workers) the number of notifications (NOTIFYs) received by each of its senders.

At step 630, determine, for each respective data parallel worker, whether the count for that respective data parallel worker is equal to the number of all of its senders. If so, then proceed to step 640. Otherwise, return to step 620.

At step 640, perform a reduce process. It is to be appreciated that step 640 is only performed by a respective data parallel worker responsive to the NOTIFY being received by that respective data parallel worker from all of its senders.

At step 650, send an acknowledgement (ACK), by each of the respective data parallel workers responsive to that respective data parallel worker having performed the reduce process.

At step 660, send updates, from only the respective data parallel workers that have sent an acknowledgement (ACK) at step 650.

A description will now be given regarding some of the many attendant features of the present invention. One feature is the use of fine-grained synchronization instead of a global barrier to synchronize between the workers of a data-parallel jobs. This improves performance if a subset of workers want to synchronize. Moreover, the present invention reduces torn-reads treads of incompletely written data) that may occur with barriers. Also, the present invention improves network bandwidth utilization since all workers do not send and wait at the same time.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection With a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only, memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the, art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method, comprising:

synchronizing, by a processor, respective ones of a plurality of data parallel workers with respect to an iterative process, wherein said synchronizing step includes individually continuing, by the respective ones of the plurality of data parallel workers, from a current iteration to a subsequent iteration of the iterative process, responsive to a satisfaction of a predetermined condition thereby, wherein the predetermined condition includes:

individually sending a per-receiver notification from each sending one of the plurality of data parallel workers to each receiving one of the plurality of data parallel workers, responsive to a sending of data there between; and individually sending a per-receiver acknowledgement from the receiving one to the sending one, responsive to a consumption of the data thereby; and wherein the each receiving one consumes model parameters, performs a reduce operation, and sends an acknowledgement to the each sending one indicating that a gradient has been consumed;

wherein at least some of the respective ones of the plurality of data parallel workers continue to the subsequent iteration at different times; and wherein the different times are based on respective times at which the predetermined condition is satisfied by the at least some of the respective ones of the plurality of data parallel workers.

2. A computer program product for data synchronization, the computer program product comprising a non-transitory computer readable storage medium having program instructions embodied therewith, the program instructions executable by a computer to cause to computer to perform a method comprising:

synchronizing, by a processor, respective ones of a plurality of data parallel workers with respect to an iterative process, wherein said synchronizing step includes individually continuing, by the respective ones of the plurality of data parallel workers, from a current iteration to a subsequent iteration of the iterative process, responsive to a satisfaction of a predetermined condition thereby, wherein the predetermined condition includes:

individually sending a per-receiver notification from each sending one of the plurality of data parallel workers to each receiving one of the plurality of data parallel workers, responsive to a sending of data there between; and individually sending a per-receiver acknowledgement from the receiving one to the sending one, responsive to a consumption of the data thereby;

wherein the each receiving one consumes model parameters, performs a reduce operation, and sends an acknowledgement to the each sending one indicating that a gradient has been consumed;

wherein at least some of the respective ones of the plurality of data parallel workers continue to the subsequent iteration at different times; and wherein the different times are based on respective times at which the predetermined condition is satisfied by the at least some of the respective ones of the plurality of data parallel workers.

* * * * *